(12) United States Patent
Nagel et al.

(10) Patent No.: US 6,930,825 B2
(45) Date of Patent: Aug. 16, 2005

(54) METHOD AND APPARATUS FOR SHARING PUMP ENERGY FROM A SINGLE PUMP ARRANGEMENT TO OPTICAL FIBERS LOCATED IN DIFFERENT FIBER PAIRS

(75) Inventors: Jonathan A. Nagel, Brooklyn, NY (US); Michael J. Neubelt, Little Silver, NJ (US)

(73) Assignee: Red Sky Systems, Inc., South Plainfield, NJ (US)

( * ) Notice: Subject to any disclaimer, the term of this patent is extended or adjusted under 35 U.S.C. 154(b) by 0 days.

(21) Appl. No.: 10/646,351

(22) Filed: Aug. 20, 2003

(65) Prior Publication Data

US 2004/0136056 A1 Jul. 15, 2004

Related U.S. Application Data

(60) Provisional application No. 60/404,719, filed on Aug. 20, 2002.

(51) Int. Cl.[7] .................................................. H01S 3/00
(52) U.S. Cl. .............................. 359/341.32; 359/341.33
(58) Field of Search ....................... 359/341.32, 341.33, 359/341.2; 398/67, 97, 173

(56) References Cited

U.S. PATENT DOCUMENTS

| | | | |
|---|---|---|---|
| 5,173,957 A | 12/1992 | Bergano et al. | 385/24 |
| 5,815,613 A | 9/1998 | Fatehi et al. | 385/22 |
| 6,101,016 A | 8/2000 | Roberts et al. | 359/177 |
| 6,606,188 B2 * | 8/2003 | Shimojoh | 359/334 |
| 2002/0057477 A1 * | 5/2002 | Rocca et al. | 359/141 |

* cited by examiner

*Primary Examiner*—Bernarr E. Gregory
*Assistant Examiner*—Deandra M. Hughes
(74) *Attorney, Agent, or Firm*—Stuart H. Meyer, Esq.; Meyer Fortkort & Williams, PC

(57) ABSTRACT

An optical repeater is provided that includes at least four optical amplifiers each supplying optical amplification to an optical signal traveling in a different unidirectional optical fiber that collectively form at least two bi-directional pairs of optical fibers. The repeater also includes a first plurality of pump sources for providing pump energy to a first optical fiber located in a first of the optical fiber pairs and a second optical fiber located in a second of the optical fiber pairs. The first optical fiber and the second optical fiber support optical signals traveling in a common direction. A first combiner arrangement combines the pump energy from the first plurality of pump sources and distributes it to the optical amplifiers supplying amplification to optical signals traveling in the first and the second optical fibers. A second plurality of pump sources provides pump energy to a third optical fiber located in the first optical fiber pair and a fourth optical fiber located in the second optical fiber pair. The third optical fiber and the fourth optical fiber support optical signals traveling in a common direction that is opposite to that of the first and second optical fibers. A second combiner arrangement combines the pump energy from the second plurality of pump sources and distributes it to the optical amplifiers supplying amplification to optical signals traveling in the third and the fourth optical fibers.

14 Claims, 2 Drawing Sheets

METHOD AND APPARATUS FOR SHARING PUMP ENERGY FROM A SINGLE PUMP ARRANGEMENT TO OPTICAL FIBERS LOCATED IN DIFFERENT FIBER PAIRS

STATEMENT OF RELATED APPLICATION

This application claims the benefit of priority to U.S. Provisional Patent Application No. 60/404,719, filed Aug. 20, 2002, entitled "Quad Amplifier and Pump Sharing Architecture," by the same inventors.

FIELD OF THE INVENTION

The present invention relates generally to optical amplifiers such as employed in optical transmission systems, and more particularly to an optical amplifier arrangement in which a failed pump source can be readily determined.

BACKGROUND OF THE INVENTION

Optical amplifiers have become an essential component in transmission systems and networks to compensate for system losses, particularly in wavelength division multiplexed (WDM) and dense wavelength division multiplexed (DWDM) communication systems. In a WDM transmission system, two or more optical data carrying channels, each defined by a different carrier wavelength, are combined onto a common path for transmission to a remote receiver. The carrier wavelengths are sufficiently separated so that they do not overlap in the frequency domain. Typically, in a long-haul optical fiber system, an optical amplifier would amplify the set of wavelength channels simultaneously, usually after traversing distances less than about 120 km.

One class of optical amplifiers is rare-earth doped optical amplifiers, which use rare-earth ions as the active element. The ions are doped in the fiber core and pumped optically to provide gain. The silica fiber core serves as the host medium for the ions. While many different rare-earth ions such as neodymium, praseodymium, ytterbium etc. can be used to provide gain in different portions of the spectrum, erbium-doped fiber amplifiers (EDFAs) have proven to be particularly attractive because they are operable in the spectral region where optical loss in the fiber is minimal. Also, the erbium-doped fiber amplifier is particularly useful because of its ability to amplify multiple wavelength channels without crosstalk penalty, even when operating deep in gain compression. EDFAs are also attractive because they are fiber devices and thus can be easily connected to telecommunications fiber with low loss.

An important consideration in the design of a WDM transmission system is reliability, particularly when the system is not readily accessible for repair, such as in undersea applications. Since the laser pump is the only active component in the amplification system, it is the most likely to degrade or fail. Such failure would render the optical amplifier, and possibly the optical communication system, inoperative. In order to overcome such an event, several techniques have been developed to design optical communication systems capable of limiting the impact of laser pump failure or degradation. For example, redundancy is sometimes used to obviate optical amplifier failures.

Redundancy can be conveniently employed when two or more optical amplifiers are employed in a single location, which is often the case in a typical long-range optical transmission system that includes a pair of unidirectional optical fibers that support optical signals traveling in opposite directions. In such systems each fiber includes an optical amplifier, which are co-located in a common housing known as a repeater. When multiple amplifiers are co-located redundancy can be achieved by sharing pump energy form all the available pumps among all the amplifiers. For example, in U.S. Pat. No. 5,173,957, the output from at least two pump sources are coupled via a 3 dB optical coupler to provide pump energy to each of two optical fiber amplifiers simultaneously. If one of the pump sources fails, the other pump source provides power to each of the optical amplifiers. Thus, failure of one laser pump causes a 50% reduction in the pumping power of each of the two optical amplifiers. Without such pump sharing, a pump failure could lead to catastrophic failure in one amplifier and no failures in the other. As long as some pump energy reaches each amplifier, there will be enough gain to convey the signals to the next optical amplifier. On the other hand, if any given amplifier were to lose all its pump energy, it becomes a lossy medium and attenuates the signals, usually leading to excessive signal-to-noise ratio at the end of the systems.

While the aforementioned pump redundancy arrangement may be satisfactory for some applications, it would be desirable to provide a pump redundancy arrangement with an even greater degree of reliability, particularly in an optical transmission system that employs multiple pairs of optical fibers.

SUMMARY OF THE INVENTION

In accordance with the present invention, an optical repeater is provided. The repeater includes at least four optical amplifiers each supplying optical amplification to an optical signal traveling in a different unidirectional optical fiber that collectively form at least two bi-directional pairs of optical fibers. The repeater also includes a first plurality of pump sources for providing pump energy to a first optical fiber located in a first of the optical fiber pairs and a second optical fiber located in a second of the optical fiber pairs. The first optical fiber and the second optical fiber support optical signals traveling in a common direction. A first combiner arrangement combines the pump energy from the first plurality of pump sources and distributes it to the optical amplifiers supplying amplification to optical signals traveling in the first and the second optical fibers. A second plurality of pump sources provides pump energy to a third optical fiber located in the first optical fiber pair and a fourth optical fiber located in the second optical fiber pair. The third optical fiber and the fourth optical fiber support optical signals traveling in a common direction that is opposite to that of the first and second optical fibers. A second combiner arrangement combines the pump energy from the second plurality of pump sources and distributes it to the optical amplifiers supplying amplification to optical signals traveling in the third and the fourth optical fibers.

In accordance with one aspect of the invention, a first passive coupling arrangement is provided for conveying excess pump energy that traverses the optical amplifiers in the first and the second optical fibers to the third and the fourth optical fibers at a location upstream from the optical amplifiers supplying amplification to optical signals traversing the third and the fourth optical fibers.

In accordance with another aspect of the invention, a second passive coupling arrangement is provided for conveying excess pump energy that traverses the optical amplifiers in the third and the fourth optical fibers to the first and the second optical fibers at a location upstream from the optical amplifiers supplying amplification to optical signals traversing the first and the second optical fibers.

In accordance with another aspect of the invention, the optical amplifiers are rare-earth doped optical amplifiers.

In accordance with another aspect of the invention, the rare-earth doped optical amplifiers are erbium-doped optical amplifiers.

In accordance with another aspect of the invention, the first combiner arrangement includes a first combiner and a first plurality of couplers coupling pump energy from the combiner to the first and the second optical fibers.

In accordance with another aspect of the invention, the second combiner arrangement includes a second combiner and a second plurality of couplers coupling pump energy from the second combiner to the third and the fourth optical fibers.

In accordance with another aspect of the invention, the first and second combiners are 2×2 combiners.

DETAILED DESCRIPTION

The present inventors have recognized that a pump sharing technique can be employed that provides redundancy to two or more pairs of optical fibers in a more reliable manner than can be achieved by the aforementioned arrangement shown in U.S. Pat. No. 5,173,957. For example, a direction application of the conventional arrangement to two fiber pairs would require at total of four pump sources, with one pair of pump sources providing power to one fiber pair and another pair of pump sources providing power to the other fiber pair. In such an arrangement a failure of two pumps supplying power to a fiber pair would result in the loss of that particular fiber pair. On the other hand, as described below, the present invention provides an arrangement in which the failure of any two pumps will not lead to the complete loss of a fiber pair. That is, at worst, the failure of two pumps will lead to the loss of only one fiber in each of the two fiber pairs, preserving the ability to carry traffic in the other fiber in each fiber pair.

For purposes of illustration the present invention will be described in connection with a four-fiber transmission path that receives pump energy from four pump sources. However, the present invention is not limited to such an arrangement. More generally, the present invention is applicable to a transmission path that employs N pairs of optical fibers with 2N optical amplifiers respectively located in each of the 2N fibers and 2N pump sources, where N is an integer greater than two.

Figure 1:
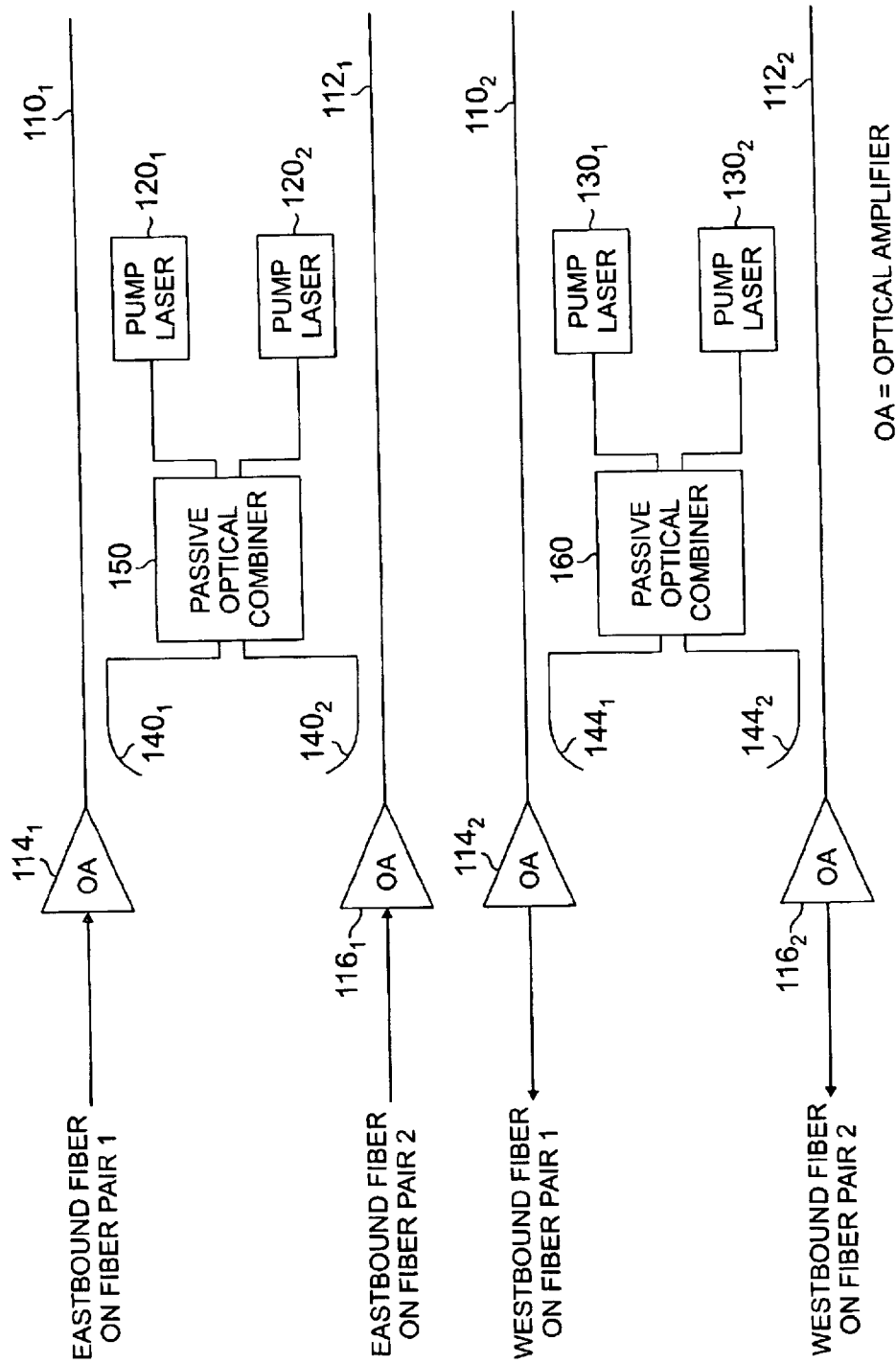
FIG. 1 shows four unidirectional optical fiber paths that each include a rare-earth doped fiber respectively, for imparting gain to the optical signals traveling along the fiber paths in accordance with the present invention.

FIG. 1 shows four unidirectional optical fiber paths $110_1$, $110_2$, $112_1$, and $112_2$ that each include a rare-earth doped fiber $114_1$, $114_2$, $116_1$, and $116_2$, respectively, for imparting gain to the optical signals traveling along the fiber paths. In a transmission system the fiber paths $110_1$, $110_2$, $112_1$, and $112_2$ are arranged in two pairs, each of which support bi-directional communication. Specifically, a first fiber pair 110 comprises unidirectional fibers $110_1$ and $110_2$ that support optical signals traveling in opposite directions. Similarly, a second fiber pair 112 comprises unidirectional fibers $112_1$ and $112_2$ that also support optical signals traveling in opposite directions with respect to one another.

In accordance with the present invention, a first pump arrangement is provided that supplies pump energy to one fiber in each of the fiber pairs 110 and 112. In particular, two pump sources $120_1$, and $120_2$ supply pump energy to the rare-earth doped fiber $114_1$, located in fiber $110_1$ of the first fiber pair 110 and to rare-earth doped fiber $116_1$ located in fiber $112_1$, of the second fiber pair 112. A 2×2 combiner/splitter 150 combines the pump energy generated by the pump sources $120_1$ and $120_2$ and splits the combined power among the rare-earth doped fibers $114_1$, and $116_1$. Coupling elements $140_1$, and $140_2$ receive the pump energy from the output ports of the 2×2 combiner/splitter 150 and respectively direct the pump energy onto the fiber paths $110_1$ and $112_1$ where the pump energy is combined with the signals. The coupling elements $140_1$, and $140_2$, which may be fused fiber couplers or wavelength division multiplexers, for example, are generally configured to have a high coupling ratio at the pump energy wavelength and a low coupling ratio at the signal wavelength.

Similar to the first pump arrangement, a second pump arrangement is provided that also supplies pump energy to one fiber in each of the fiber pairs 110 and 112. In particular, two pump sources $130_1$ and $130_2$ supply pump energy to the rare-earth doped fiber $114_2$ located in fiber $110_2$ of the first fiber pair 110 and to rare-earth doped fiber $116_2$ located in fiber $112_2$ of the second fiber pair 112. A 2×2 combiner/splitter 160 combines the pump energy generated by the pump sources $130_1$, and $130_2$ and splits the combined power among the rare-earth doped fibers $114_2$ and $116_2$. Coupling elements $144_1$ and $144_2$ receive the pump energy from the output ports of the 2×2 combiner/splitter 160 and respectively direct the pump energy onto the fiber paths $110_2$ and $112_2$ where the pump energy is combined with the signals. Like coupling elements $140_1$, and $140_2$, the coupling elements $144_1$ and $144_2$ may comprise any appropriate coupling arrangement known to those of ordinary skill in the art, including fused fiber couplers or wavelength division multiplexers, for example.

Because in the present invention each pump arrangement provides power to fibers located in a different fiber pair, the failure of any two pumps will still allow traffic to be carried in one direction along each of the two fiber pairs. For example, referring to FIG. 1, a failure of both pumps sources $120_1$ and $120_2$ will lead to the loss of traffic in optical fibers $110_1$ and $112_1$ of the first fiber pair 110 and the second fiber pair 112, respectively. Traffic in optical fiber $110_2$ of the first fiber pair 110 and optical fiber $112_2$ of the second fiber pair will be unaffected. On the other hand, however, if two pumps were to fail, with each pump located in a different one of the pump arrangements, traffic on none of the fibers would be lost. For example, a failure of both pump source $120_1$ (or pump source $120_2$) in the first pump arrangement and pump source $130_1$ (or pump source $130_2$) in the second pump arrangement would only reduce by half the total power supplied to the fibers $110_1$, $110_2$, $112_1$, and $112_2$, thus allowing traffic to continue along all four fibers $110_1$, $110_2$, $112_1$, and $112_2$.

Figure 2:
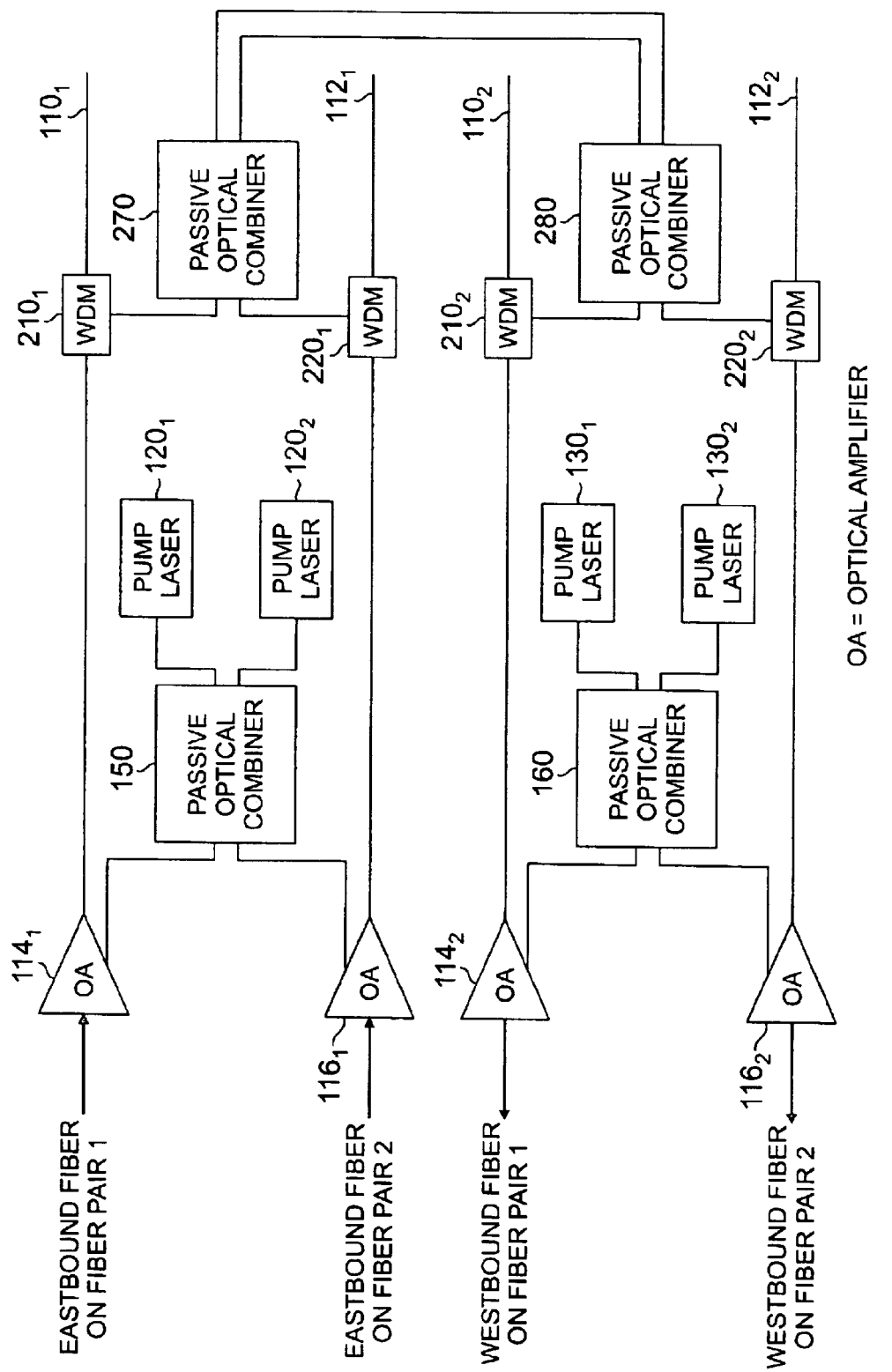
FIG. 2 shows an alternative embodiment of the invention.

FIG. 2 shows an alternative embodiment of the invention that provides for a higher degree of redundancy that the pumping arrangement shown in FIG. 1. In FIGS. 1 and 2, like elements are indicated by like reference numerals. In this embodiment of the invention excess or unused co-propagating pump power that traverses rare-earth doped fibers $114_1$ and $116_1$ and continues downstream (e.g., in the eastbound direction) along fibers $110_1$ and $112_1$ is transferred to fibers $110_2$ and $112_2$, where the excess power travels downstream (e.g. in the westbound direction) to co-pump rare-earth doped fibers $114_2$ and $116_2$. This transfer or recycling of pump power is achieved by a passive coupling arrangement that includes coupling elements $210_1$, $210_2$, $220_1$, and $220_2$ and 2×2 combiner/splitters 270 and 280.

As shown, coupling elements $210_1$ and $220_1$ are respectively located in fiber $110_1$ of the first fiber pair 110 and fiber $112_1$ of the second fiber pair 112. Coupling elements $210_1$ and $220_1$ are located downstream from rare-earth doped fibers $114_1$, and $116_1$, respectively. In addition, coupling elements $210_2$ and $220_2$ are respectively located in fiber $110_2$ of the first fiber pair and fiber $112_2$ of the second fiber pair 112. Coupling elements $210_2$ and $220_2$ are located upstream from rare-earth doped fibers $114_2$ and $116_2$, respectively.

In operation, 2×2 combiner/splitter 270 receives excess pump energy from couplers $210_1$ and $220_1$ and outputs a portion of the combined pump power to each input of 2×2 combiner/splitter 280. Combine/splitter 280, in turn, combines and splits the power received on its inputs and directs each portion of the split power to coupling elements $210_2$ and $220_2$. In this way the excess pump power is conveyed to fibers $110_2$ and $112_2$ so that it can travel downstream to rare-earth doped fibers $114_2$ and $116_2$.

The passive coupling arrangement depicted in FIG. 2 transfers excess pump power traveling in the eastbound direction along fibers $110_1$ and $112_1$ so that it travels in the westbound direction along fibers $110_2$ and $112_2$. Those of ordinary skill in the art will recognize that a similar arrangement may be employed to transfer excess pump power traveling in the westbound direction along fibers $110_2$ and $112_2$ to the eastbound direction along fibers $110_1$ and $112_1$ so that it can be provided to erbium doped fibers $114_1$ and $116_1$. In this case two additional 2×2 combiner/splitters are employed along with four coupling elements, two of which are located upstream from rare-earth doped fibers $114_1$, and $116_1$ along fibers $110_1$ and $112_2$, respectively, and two of which are located downstream from rare-earth doped fibers $114_2$ and $116_2$ along fibers $110_2$ and $112_2$, respectively.

By using the aforementioned arrangement in which excess pump power is transferred from the eastbound to the westbound direction, as well as from the westbound to the eastbound direction, if any three of the pump sources $120_1$, $120_2$, $130_1$, and $130_2$ were to fail, sufficient pump power could be supplied by the remaining operational pump source to allow traffic to continue along all four fibers of fiber pairs 110 and 112. In this way a very high degree of reliability is achieved since all four pump sources must fail to completely lose traffic on all four fibers.

What is claimed is:

1. An optical repeater, comprising:
   at least four optical amplifiers each supplying optical amplification to an optical signal traveling in a different unidirectional optical fiber that collectively form at least two bi-directional pairs of optical fibers;
   a first plurality of pump sources for providing pump energy to a first optical fiber located in a first of the optical fiber pairs and a second optical fiber located in a second of the optical fiber pairs, said first optical fiber and said second optical fiber supporting optical signals traveling in a common direction;
   a first combiner arrangement combining the pump energy from the first plurality of pump sources and distributing it to the optical amplifiers supplying amplification to optical signals traveling in the first and the second optical fibers;
   a second plurality of pump sources for providing pump energy to a third optical fiber located in said first optical fiber pair and a fourth optical fiber located in said second optical fiber pair, said third optical fiber and said fourth optical fiber supporting optical signals traveling in a common direction that is opposite to that of said first and second optical fibers; and
   a second combiner arrangement combining the pump energy from the second plurality of pump sources and distributing into the optical amplifiers supplying amplification to optical signals traveling in the third and the fourth optical fibers;
   a first passive coupling arrangement for conveying excess pump energy that traverses the optical amplifiers in the first and the second optical fibers to the third and the fourth optical fibers at a location upstream from the optical amplifiers supplying amplification to optical signals traversing the third and the fourth optical fibers.

2. The optical repeater of claim 1 further comprising a second passive coupling arrangement for conveying excess pump energy that traverses the optical amplifiers in the third and the fourth optical fibers to the first and the second optical fibers at a location upstream from the optical amplifiers supplying amplification to optical signals traversing the first and the second optical fibers.

3. The optical repeater of claim 1 wherein said optical amplifiers are rare-earth doped optical amplifiers.

4. The optical repeater of claim 3 wherein said rare-earth doped optical amplifiers are erbium-doped optical amplifiers.

5. The optical repeater of claim 1 wherein said first combiner arrangement includes a first combiner and a first plurality of couplers coupling pump energy from said combiner to the first and the second optical fibers.

6. The optical repeater of claim 5 wherein said second combiner arrangement includes a second combiner and a second plurality of couplers coupling pump energy from said second combiner to the third and the fourth optical fibers.

7. The optical repeater of claim 6 wherein said first and second combiners are 2×2 combiners.

8. An optical repeater, comprising:
   at least four optical amplifiers each supplying optical amplification to an optical signal traveling in a different unidirectional optical fiber that collectively form at least two bi-directional pairs of optical fibers;
   a first plurality of pump sources for providing pump energy to a first optical fiber located in a first of the optical fiber pairs and a second optical fiber located in a second of the optical fiber pairs, said first optical fiber and said second optical fiber supporting optical signals traveling in a common direction;
   a first combiner arrangement combining the pump energy from the first plurality of pump sources and distributing substantially all of the combined pump energy from the first plurality of pump sources to the optical amplifiers supplying amplification to optical signals traveling in the first and the second optical fibers;
   a second plurality of pump sources for providing pump energy to a third optical fiber located in said first optical fiber pair and a fourth optical fiber located in said second optical fiber pair, said third optical fiber and said fourth optical fiber supporting optical signals traveling in a common direction that is opposite to that of said first and second optical fibers;
   a second combiner arrangement combining the pump energy from the second plurality of pump sources and distributing substantially all of the pump energy from the second plurality of pump sources to the optical amplifiers supplying amplification to optical signals traveling in the third and the fourth optical fibers; and a first passive coupling arrangement for conveying excess pump energy that traverses the optical amplifiers in the first and the second optical fibers to the third and the fourth optical fibers at a location upstream from the optical amplifiers supplying amplification to optical signals traversing the third and the fourth optical fibers.

9. The optical repeater of claim 8 further comprising a second passive coupling arrangement for conveying excess pump energy that traverses the optical amplifiers in the third and the fourth optical fibers to the first and the second optical fibers at a location upstream from the optical amplifiers supplying amplification to optical signals traversing the first and the second optical fibers.

10. The optical repeater of claim 8 wherein said optical amplifiers are rare-earth doped optical amplifiers.

11. The optical repeater of claim 10 wherein said rare-earth doped optical amplifiers are erbium-doped optical amplifiers.

12. The optical repeater of claim 8 wherein said first combiner arrangement includes a first combiner and a first plurality of couplers coupling pump energy from said combiner to the first and the second optical fibers.

13. The optical repeater of claim 12 wherein said second combiner arrangement includes a second combiner and a second plurality of couplers coupling pump energy from said second combiner to the third and the fourth optical fibers.

14. The optical repeater of claim 13 wherein said first and second combiners are 2×2 combiners.

* * * * *